United States Patent Office 3,300,349

Patented Jan. 24, 1967

3,300,349

CHEMICAL MILLING PROCESS AND RELATED SOLUTIONS FOR ALUMINUM

John Alfred Tershin, South Seattle, and Earl Howells, Seattle, Wash., assignors to The Boeing Company, Seattle, Wash., a corporation of Delaware No Drawing. Filed Apr. 15, 1964, Ser. No. 360,123
10 Claims. (Cl. 156—22)

This invention relates in general to a chemical milling process and in particular to a process having variable rates of removing material in its milling operations with an adjustable solution range accounting for the variable rates of material removed.

It is an object of this invention to achieve a chemical milling process with its related solutions for aluminum alloys and in particular for aluminum alloys having appreciable copper and zinc contents.

It is another object of this invention to achieve a chemical milling process with its requisite surface finish and uniform fillet configurations for an aluminum alloy having appreciable copper and zinc contents.

It is another object of this invention to achieve a chemical milling process on an aluminum alloy having appreciable copper and zinc contents while controlling the intergranular attack on the grain boundaries of the metal at a uniform rate comparable to the rate of attack on the rest of the material.

Further objects and applications of this invention will become apparent from the following description and the appended claims.

Chemical milling as described in U.S. Patent No. 2,739,047 is the process of removing metal in a controlled manner by selective chemical etching in either an acid or an alkaline solution to produce recessed patterns, tapers, overall reduction of metal surfaces and various other types of controlled metal removal. This process is used to produce configurations or to achieve metal removal which either cannot be machined or can be machined only at unreasonably high cost and inconvenience.

Although chemical etching has been used for many years, deep etching or milling to produce structural contours is a relatively new procedure. The chemical milling process consists of the three basic steps of cleaning, masking and milling. An additional step can be scribing if it is so desired. This step involves altering the masking layer so as to allow limited etching within the masked area.

The cleaning step consists of removing grease, oils, heavy oxides and other contamination from the surface of the specimen to be subjected to chem-milling. The reason for such removal of these materials is that these contaminates will interfere with a uniform chemical milling operation by masking the under-lying material from the attack of the acid or alkali employed.

The masking step consists of imposing a tight impregnable mask upon the surface desired to be kept free of attack. In this step it is an object to achieve a complete absence of chemical attack from the area masked.

The milling step consists of exposing the surface of the particular article to the attack of an acid or alkali. This attack is performed at a controlled rate, usually in the neighborhood of 0.001 inch/minute, until the required metal is removed. Moderate, non-directional agitation of the solution is required to minimize concentration and temperature gradients. Care is to be taken so the solution does not impinge directly upon the part. It is also desirable to have vertical part circulation to prevent gas channeling and to smooth out scratches and other surface defects. Proper circulation practices are important to ensure uniform milling.

The usual milling procedure is to determine the current milling rate and expose the part to the milling solution for 50% to 80% of the calculated time required to attain the desired depth of cut. The part is then measured to redetermine the milling rate and to detect any excessive tapering or other irregularities requiring special processing. Then the part is reimmersed in the milling solution until the desired metal removal is accomplished. Very fine tolerances may be met by performing the final milling operation at a very slow milling rate. This final step can also be used to remove sanding scratches, machining burrs and slight tapers on the part which would otherwise require excessive machining expense.

The chemical solutions of this invention have the advantages of attaining closer thickness tolerances, smoother surface finishes, uniform fillet configurations and greater fatigue life of the article milled. The surface finish produced by chem-milling is influenced by variations in the chemistry and alloy structure of the aluminum and by the chemical etching and film forming mechanisms which take place during the chemical attack. Simple alkaline milling solutions reproduce surface irregularities such as scratches, nicks and gouges and may produce rough, sharp grain boundaries. More sophisticated solutions, such as the milling solutions described herein, reduce surface irregularities, produce grain boundaries having a smooth, rolling character and consistently yield more uniform surface finishes than do previous solutions. The fatigue life of chemically milled aluminum parts with shallow cuts (less than 0.04 inch) is equivalent to that of machined parts having a similar finish. The smooth "rolling" grain boundaries produced by the instant milling solutions reduce the stress riser effect, promoting maximum fatigue life.

This invention relates to an improvement in the milling stage of the chemical milling operation for an aluminum alloy in general and in particular for an aluminum alloy with a high percentage of copper and zinc, such as the 2219 aluminum alloys. This invention can be practiced in the chem-milling of any standard aluminum alloy, but is particularly adapted to an aluminum alloy having high contents of zinc and copper. It achieves the desired surface finish, the right fillet configuration and insignificant intergranular attack. In actual use the 2219 aluminum is employed in the design of tank gores with the resulting configuration needing a chemical milling operation to remove a great amount of excess metal because other standard milling practices would not be practical or capable of being used on this configuration. The weight removal from the milling results in greatly improved economy of operation.

This invention, which is an improvement over past chemical milling operations of this 2219 aluminum, consists of a milling process with unique solutions being employed in this milling process. The process consists of using a caustic cyanide solution containing a wetting agent, an anti-foaming agent, dissolved aluminum metal and a film forming material such as a salt of carboxymethylcellulose. This solution has a film forming disposition which characterizes it from other solutions and gives it distinctive milling characteristics. Also this solution dissolves and holds in solution the alloying constituents of copper and zinc.

When the chemical milling solution comes into contact with the part, the film is distributed by overcoming the surface tension on the surface of the object. This film aids in obtaining a uniform milling rate because it serves the function of having a uniform concentration of the chemical milling solution at any point on the surface being milled.

The problem presented in milling 2219 aluminum is that to achieve a good chem-milling operation the copper and zinc and any combination thereof, with the aluminum, must be etched and removed from the surface at the same rate to avoid pits, cavities, surface waviness and non-uniform fillets. If one constituent of an alloy is dissolved at a more rapid rate than the other constituents, pitting and other flaws will result. This problem is solved by using our solutions because certain milling constituents, such as sodium cyanide, act as sequestering agents in the caustic solution. A sequestering agent dissolves the aluminum and the alloying elements in the aluminum forming soluble complexes which effectively remove the products of the alkaline attack upon the aluminum.

At this point it should be noted that prior to this invention it has been impossible to chem-mill 2219 aluminum and obtain satisfactory fillet configuration, surface finish, line definition and uniform depth of cut. By use of this caustic-cyanide etchant, an aluminum material can be successfully chem-milled to a depth in excess of one-half inch.

The instant invention uses the following solution to attack the aluminum alloy after the initial surface preparation, cleaning, masking and scribing:

| | Oz./gal. |
|---|---|
| A strong alkali selected from the group consisting of sodium hydroxide and potassium hydroxide and mixtures thereof | 10.00 to 30.00 |
| An alkaline cyanide selected from the group consisting of sodium cyanide and potassium cyanide and mixtures thereof | 2.00 to 15.00 |
| A hydrophilic film forming agent selected from the group consisting of potassium carboxymethylcellulose, sodium carboxymethylcellulose, ammonium carboxymethylcellulose, gum tragacanth, gelatin, gum arabic, agar-agar, agar, cherry gum, wheat gluten, and locust bean gum | 0.52 to 2.00 |
| A wetting agent of sulfonated castor oil | 0.10 to 0.40 |
| Aluminum (in solution) | 1.00 to 18.00 |
| Water the balance. | |

The solution performs chem-milling with or without the addition of an anti-foaming agent so as to cover the surface of the solution. Another embodiment of this invention is the following solution with more limited ranges:

| | Oz./gal. |
|---|---|
| A strong alkali selected from the group consisting of sodium hydroxide and potassium hydroxide and mixtures thereof | 10.00 to 15.00 |
| An alkaline cyanide selected from the group consisting of sodium cyanide and potassium cyanide and mixtures thereof | 2.00 to 6.00 |
| A hydrophilic film forming agent selected from the group consisting of potassium carboxymethylcellulose, sodium carboxymethylcellulose, ammonium carboxymethylcellulose, gum tragacanth, gelatin, gum arabic, agar, agar-agar, cherry gum, wheat gluten and locust bean gum | 0.25 to 2.00 |
| A wetting agent of sulfonated castor oil | 0.10 to 0.40 |
| Aluminum (in solution) | 1.00 to 4.00 |
| Water the balance. | |

The solution performs chem-milling with or without the addition of an anti-foaming agent so as to cover the surface of the solution. A more limited embodiment of this invention is the following:

| | Oz./gal. |
|---|---|
| Sodium hydroxide (Na OH) | 10.00 to 15.00 |
| Sodium cyanide (Na CN) | 2.00 to 6.00 |
| Sodium carboxymethylcellulose | 0.25 to 2.00 |
| Sulfonated castor oil | 0.10 to 0.40 |
| Aluminum (in solution) | 1.00 to 4.00 |
| Water the balance. | |

The solution performs chem-milling with or without the addition of an anti-foaming agent so as to cover the surface of the solution. Initial formulation of the instant chem-milling solution is done so as to achieve the following composition:

| | Oz./gal. |
|---|---|
| Sodium hydroxide (Na OH) | 14.00 |
| Sodium cyanide (Na CN) | 4.00 |
| Sodium carboxymethylcellulose | 0.50 |
| Sulfonated castor oil | 0.25 |
| Aluminum (in solution) | 2.00 |
| Water the balance. | |

The solution performs chem-milling with or without the addition of an anti-foaming agent so as to cover the surface of the solution.

After initial degreasing, cleaning, masking and scribing of the article to be chem-milled, the article is contacted with the above solution range of this invention. Normal care is practiced in handling the part and handling of the chem-milling solution. After the period of contacting the article with the milling solution the surface of the article is washed free of the milling solution which completes the chem-milling cycle. Up to 15 ounces per gallon of sodium cyanide (Na CN) can be used, but we have achieved a desired efficiency with 4.00 ounces per gallon. Other cyanide salts such as potassium cyanide can be used. Typical wetting agents and anti-foaming agents can be employed as they are known in the art. The wetting agent assists the solution in overcoming surface tension which opposes the wetting action. The only limitation in employing a wetting agent is the criterion that it must not react with the chemical solution or interfere with the efficiency of the chemical milling solution. The anti-foaming agent prevents excessive bubble formation on the surface of the chem-milling solution. The addition of aluminum forms aluminum irons which promotes the removal of the aluminum during chem-milling. The temperature control of the milling operation enhances the efficiency of the metal removal with 180° to 195° F. range being optimum, although milling continues at temperatures beyond this range.

Further understanding of this invention can be enhanced by a discussion of the operation of each component of the chem-milling solution. The sodium hydroxide (Na OH)) is the basic component of this chem-milling solution and furnishes the attacking medium of the solution which removes the aluminum material in the form of sodium aluminate.

The sodium cyanide forms chemical complexes with aluminum and the alloying constituents of an aluminum alloy thus serving to help the removal of these components in cooperation with the attack of the hydroxide.

Various chemical additives characterized as hydrophilic film forming agents, and in particular sodium, potassium or ammonium carboxymethylcellulose, provide a film forming medium when in an alkaline chem-milling solution. This film serves to uniformly cover the surface being milled thus ensuring a uniform controlled attack on the surface.

The hydrophilic film forming agent has the function of (1) forming a uniform film layer on an article, (2) serving as a thickening agent, (3) acting as a suspension agent and forming a protective colloid. After the part is etched, the film formed around the article may be removed easier than smut layers prevalent on parts etched by other compounds. For example, most of the film may be removed by hosing the part with water. A list of hydrophilic film forming agents includes gum tragacanth, gelatin, gum arabic, agar, agar-agar, cherry gum, wheat gluten, locust bean gum, ammonium carboxymethylcellulose, sodium carboxymethylcellulose and potassium carboxymethylcellulose.

A wetting agent, such as sulfonated castor oil, is employed to overcome variations in the surface tension, thus allowing the film forming medium to spread uniformly on the surface of the article and the chem-milling solution to uniformly contact the surface by means of the hydrophilic film forming agent.

A metallic ion, such as an aluminum ion, is added to the chemical milling solution because its presence in the solution increases the milling efficiency of the solution and provides superior surface finish characteristics.

As anti-foaming agent, such as normal tributyl phosphate, serves the function of preventing foam formation on the chem-milling solution.

It is to be understood that all chemicals employed in this invention are of standard commercial grade. The milling solution of this invention employs an aqueous base.

The term "metallic sheet" as used in the following chem-milling procedure and as used in this invention implies any stock or sheets of constant or varying thickness and further includes other shapes, such as tubes, bare rods which are merely sheets or stock formed into hollow or solid form.

Chem-milling may be done simultaneously on more than one surface and in a wide variety of designs. There is no limitation on the types and sizes of the formed material which may be treated by this process.

The practice of this invention of chem-milling is to evenly or uniformly chem-mill the material to be removed after the metallic sheet has been formed. This is accomplished by exposing the desired areas of the sheet to the action of the above described solutions. These solutions attack the metallic sheet at the exposed areas (unmasked areas) resulting in a skin similar to the conventional mill skin. The process is usually carried out in a tank in which the metallic sheet is immersed. A metallic sheet completely immersed in a caustic-containing tank, with the caustic having an additive such as a cyanide, will be evenly attacked at the exposed areas, thus forming chem-milled areas at those points. An elastomeric type etch-proof film can be used to protect the areas not to be attacked.

In actual practice the metallic sheet was vapor degreased with a standard solvent with an example being trichloroethylene. Alkaline cleaning was the next step which removes all rust, scale, etc. Any normal commercial alkaline cleaner achieves this result.

After this preliminary preparation, the metallic sheet was masked where desired with four dip coats or equivalent applications of an elastomer type maskant followed by air or oven curing. Any necessary scribing is done at this point. Next, the part is submerged in a tank containing a composition of the chemical ranges given above. The solution in the tank is properly circulated while the chem-milling step is proceeding with the temperature of the solution being maintained at 180° to 195° F.

The rate of etching is dependent on various factors, such as temperature, time, caustic concentration and types of starting material. The piece to be treated may be immersed for a set period, removed, washed, pickled, and/or anodized or otherwise surface treated. It will be found that exposed areas of the piece have been evenly attacked; it will be apparent that if attacks of various depths are desired that the metallic sheet may be removed from the etching bath and additional protective film placed on areas where further attack is not wanted. Further, the metallic sheet can be constantly or intermittently withdrawn from the treatment zone so that various zones of the sheet will be etched for continuously or intermittently varying periods of time. Thus, it can be seen that tapered skins or sheets can easily be formed by this process.

It is commonly known that the etched surface of aluminum alloy treated in an alkaline solution which does not have any additives in the solution results in a bumpy, nodular finish (see Newman et al., Patent Numbers 2,795,490 and 2,795,491). However, where the solution is a nodulizing etching solution the surface so obtained is free from this type of finish and has a uniform texture similar to a mechanically milled specimen.

The advantages of the instant invention are numerous. The instant solution range has successfully chem-milled aluminum and the following aluminum alloys: 2219, 2024, 6061, 7178 and 7075. Not only is the aluminum or aluminum alloy uniformly milled but a desired surface finish free from pitting and other flaws is attained. The tolerances attained are of the order of +/−0.002 inch as against the usual tolerances of +/−0.010 inch in mechanical milling. There is no limitation as to size and complexity of design in chemical milling as there is in mechanical milling. A further advantage of this chemical milling process is the extreme ease in forming various configurations on the surfaces to be treated. For example, load distribution patterns in the form of stiffeners can be easily formed integrally on sheet surfaces by the aircraft load designer. The process further permits a simplified inexpensive process of construction eliminating riveting, seam welding and spot welding methods. Further, the chemical process of milling is one which may be more easily and accurately controlled. Also, with the elimination of riveting and multiplicity of joints a structure having a greater degree of liquid tightness is possible. Further, a great number of formed sheets may be treated in a single tank in one operation.

While we have described and illustrated some preferred forms of our invention, it should be understood that many modifications may be practiced without departing from the spirit and scope of the invention and it should therefore be understood that this invention is limited only by the scope of the appended claims.

We claim:

1. A chemical milling solution substantially comprised of the following components:

| | Oz./gal. |
|---|---|
| (a) A strong alkali selected from the group consisting of sodium hydroxide and potassium hydroxide and mixtures thereof | 10.00 to 30.00 |
| (b) An alkaline cyanide selected from the group consisting of sodium cyanide and potassium cyanide and mixtures thereof | 2.00 to 15.00 |
| (c) A hydrophilic film forming agent selected from the group consisting of potassium carboxymethylcellulose, sodium carboxymethylcellulose, ammonium carboxymethylcellulose, gum tragacanth, gelatin, gum arabic, agar, agar-agar, cherry gum, wheat gluten and locust bean gum | 0.25 to 2.00 |
| (d) A wetting agent of sulfonated castor oil | 0.10 to 0.40 |
| (e) Aluminum (in solution) | 1.00 to 18.00 |
| (f) Water | the balance. |

2. A chemical milling solution substantially comprised as follows:

| | Oz./gal. |
|---|---|
| Sodium hydroxide (Na OH) | 10.00 to 15.00 |
| Sodium cyanide (Na CN) | 2.00 to 6.00 |
| Sodium carboxymethylcellulose | 0.25 to 2.00 |
| Sulfonated castor oil | 0.10 to 0.40 |
| Aluminum (in solution) | 1.00 to 4.00 |
| Water | the balance. |

3. A chemical milling solution substantially comprised as follows:

| | Oz./gal. |
|---|---|
| Potassium hydroxide (K OH) | 10.00 to 30.00 |
| Potassium cyanide (K CN) | 2.00 to 15.00 |
| Potassium carboxymethylcellulose | 0.25 to 2.00 |
| Sulfonated castor oil | 0.10 to 0.40 |
| Aluminum (in solution) | 1.00 to 18.00 |
| Water | the balance. |

4. A chemical milling solution substantially comprised as follows:

| | Oz./gal. |
|---|---|
| Sodium hydroxide (Na OH) | 10.00 to 30.00 |
| Sodium cyanide (Na CN) | 2.00 to 15.00 |
| Sodium cyanide (Na CN) | 0.25 to 2.00 |
| Sulfonated castor oil | 0.10 to 0.40 |
| Aluminum (in solution) | 1.00 to 18.00 |
| Water | the balance. |

wherein the surface of said solution is covered with a layer of normal tributyl phosphate.

5. In a chemical milling process for aluminum and aluminum alloys employing the steps of cleaning, masking, scribing and chem-milling of an article, the improvement comprising the use of the following solution in the chem-milling step:

| | Oz./gal. |
|---|---|
| Sodium hydroxide (Na OH) | 10.00 to 30.00 |
| Sodium cyanide (Na CN) | 2.00 to 15.00 |
| Sodium carboxymethylcellulose | 0.25 to 2.00 |
| Sulfonated castor oil | 0.10 to 0.40 |
| Aluminum (in solution) | 1.00 to 18.00 |
| Water | the balance. |

6. In a chemical milling process for aluminum and aluminum alloys employing the steps of cleaning, masking scribing and chem-milling of an article, the improvement comprising the use of the following solution in the chem-milling step:

| | Oz./gal. |
|---|---|
| Sodium hydroxide (Na OH) | 1.00 to 15.00 |
| Sodium cyanide (Na CN) | 2.00 to 6.00 |
| Sodium carboxymethylcellulose | 0.50 to 2.00 |
| Sulfonated castor oil | 0.10 to 0.40 |
| Aluminum (in solution) | 1.00 to 4.00 |
| Water | the balance. |

wherein the surface of said solution is covered with a layer of normal tributyl phosphate.

7. In a chemical milling process for aluminum and aluminum alloys employing the steps of cleaning, masking, scribing and chem-milling of an article, the improvement comprising the use of the following solution in the chem-milling step:

| | Oz./gal. |
|---|---|
| Sodium hydroxide (Na OH) | 14.00 |
| Sodium cyanide (Na CN) | 4.00 |
| Sodium carboxymethylcellulose | 0.50 |
| Sulfonated castor oil | 0.25 |
| Aluminum (in solution) | 2.00 |
| Water | the balance. |

wherein the surface of said solution is covered with a layer of normal tributyl phosphate.

8. A chemical milling process for aluminum and aluminum alloys comprising the steps of freezing the surface of the article, masking the article, scribing the article and attacking the surface of the article with a solution substantially comprised as follows:

| | Oz./gal. |
|---|---|
| Sodium hydroxide (Na OH) | 1.00 to 15.00 |
| Sodium cyanide (Na CN) | 2.00 to 6.00 |
| Sodium carboxymethylcellulose | 0.25 to 2.00 |
| Sulfonated castor oil | 0.10 to 0.40 |
| Aluminum (in solution) | 1.00 to 4.00 |
| Water | the balance. |

9. A chemical milling process for aluminum and aluminum alloys comprising the steps of freeing the surface of the article, masking the article, scribing the article and attacking the surface of the article with a solution substantially comprised as follows:

| | Oz./gal. |
|---|---|
| Sodium hydroxide (Na OH) | 14.00 |
| Sodium cyanide (Na CN) | 4.00 |
| Sodium carboxymethylcellulose | 0.50 |
| Sulfonated castor oil | 0.25 |
| Aluminum (in solution) | 2.00 |
| Water | the balance. |

10. A chemical milling solution substantially comprised as follows:

| | Oz./gal. |
|---|---|
| (a) a strong alkali selected from the group consisting of sodium hydroxide, potassium hydroxide and mixtures thereof | 10.00 to 30.00 |
| (b) an alkaline cyanide selected from the group consisting of sodium mixtures thereof | 2.00 to 15.00 |
| cyanide, potassium cyanide and | |
| (c) a hydrophilic film forming agent consisting of a salt of carboxymethylcellulose | 0.25 to 2.00 |
| (d) a wetting agent of sulfonated castor oil | 0.10 to 0.40 |
| (e) aluminum (in solution) | 1.00 to 18.00 |
| Water | the balance. |

References Cited by the Examiner

UNITED STATES PATENTS

| | | | |
|---|---|---|---|
| 2,649,361 | 8/1953 | Springer et al. | 156—18 |
| 2,975,039 | 3/1961 | Elliott | 156—22 |

FOREIGN PATENTS

| | | |
|---|---|---|
| 750,803 | 6/1956 | Great Britain. |

A. WYMAN, *Primary Examiner.*

JACOB STEINBERG, *Examiner.*